(12) United States Patent
Prado et al.

(10) Patent No.: US 8,701,476 B2
(45) Date of Patent: Apr. 22, 2014

(54) SENSOR ASSEMBLY WITH RESILIENT CONTACT PORTIONS

(75) Inventors: Leandro Westmann Prado, Braganca Paulista-SP (BR); Ednei Lopes, Braganca Paulista (BR)

(73) Assignee: Tyco Electronics Brasil LTDA, Sao Paulo (BR)

( * ) Notice: Subject to any disclaimer, the term of this patent is extended or adjusted under 35 U.S.C. 154(b) by 0 days.

(21) Appl. No.: 13/613,040

(22) Filed: Sep. 13, 2012

(65) Prior Publication Data

US 2013/0068004 A1    Mar. 21, 2013

Related U.S. Application Data

(60) Provisional application No. 61/535,395, filed on Sep. 16, 2011.

(51) Int. Cl.
 *G01M 15/04* (2006.01)

(52) U.S. Cl.
 USPC ..................................... 73/114.37; 73/114.31

(58) Field of Classification Search
 USPC .......................................... 73/114.31, 114.37
 See application file for complete search history.

(56) References Cited

U.S. PATENT DOCUMENTS

| | | | |
|---|---|---|---|
| 4,758,187 A | 7/1988 | Guglhor | |
| 6,212,946 B1 * | 4/2001 | Naegele et al. | 73/114.31 |
| 6,255,728 B1 | 7/2001 | Nasiri et al. | |
| 6,272,913 B1 * | 8/2001 | Naegele et al. | 73/114.31 |
| 6,309,259 B1 * | 10/2001 | Yamashita | 439/742 |
| 6,450,839 B1 * | 9/2002 | Min et al. | 439/751 |
| 6,688,895 B1 * | 2/2004 | Fan | 439/82 |
| 6,722,928 B1 | 4/2004 | Noda et al. | |
| 6,889,664 B2 | 5/2005 | Worth et al. | |
| 7,048,594 B2 | 5/2006 | Tsuchiya | |
| 7,061,076 B2 | 6/2006 | Shiffer | |
| 7,083,434 B1 | 8/2006 | Blossfeld | |
| 7,306,493 B2 * | 12/2007 | Seo et al. | 439/751 |
| 7,458,274 B2 | 12/2008 | Lamb et al. | |
| 7,503,811 B2 * | 3/2009 | Seo et al. | 439/751 |
| 8,092,262 B1 | 1/2012 | Frederick et al. | |
| 8,192,078 B2 * | 6/2012 | Gebauer et al. | 374/144 |
| 2004/0112730 A1 * | 6/2004 | Blossfeld | 200/284 |
| 2005/0090155 A1 * | 4/2005 | Blossfeld | 439/751 |
| 2009/0323760 A1 * | 12/2009 | Gebauer et al. | 374/143 |

* cited by examiner

*Primary Examiner* — Freddie Kirkland, III

(57) ABSTRACT

A sensor assembly for use in a vehicle. The sensor assembly has a housing for receiving a substrate. Terminals with substrate mating portions are provided in the housing. The substrate has components mounted thereon and plated openings which extend therethrough. The plated openings are provided in electrical engagement with the terminals. The openings are provided to mechanically and electrically engage the resilient contact portions of the terminals. The substrate mating portions are releasably pressure fit within the plated openings to allow the substrate to be removed and replaced as needed. The substrate mating portions maintain the electrical and mechanical connection between the substrate mating portions and the plated openings when the sensor assembly is exposed to vibration.

18 Claims, 10 Drawing Sheets

SENSOR ASSEMBLY WITH RESILIENT CONTACT PORTIONS

FIELD OF THE INVENTION

The present invention is directed to a sensor assembly which houses a substrate, and in particular, to a sensor assembly which uses a resilient or compliant portion to connect the sensor assembly substrate to a connector or other mating interface.

BACKGROUND OF THE INVENTION

Sensor assemblies are used in many automotive applications, including in engine compartments. As an example, the engine manifold typically includes sensors for sensing manifold pressure, manifold air temperature, or both, or for sensing other manifold conditions. For example, the sensor may be a manifold air pressure (MAP) sensor and the sensing component may be a pressure port or pressure sensing element. Alternatively, the sensor may be a temperature manifold air pressure sensor (TMAP), and the sensing components may be a temperature sensing element and a pressure sensing element. Still alternatively, the sensor may be a temperature sensor, with the sensing component being a temperature sensing element.

Such sensor generally houses the sensing elements in a housing. Leads or terminals of the sensor are positioned in electrical engagement with the sensing elements, such that the data gathered by the sensing elements can be transmitted across the terminals, through a mating interface and to a controller which controls the engine.

While many of these known sensor assemblies operate properly in the environment in which they are positioned, the assembly of the various components within the housing of the sensor is difficult and expensive, requiring specialized equipment. As an example, the pressure sensing element and the temperature sensing element of a TMAP sensor may be placed in electrical connection with the terminals of the housing by means of wire bonding. This requires precise handling of the wire bonds and accurate soldering of the wires to the elements and the terminals. Alternatively, the sensing elements may be positioned and secured to a printed circuit board or other such substrate and the substrate placed in electrical connection with the terminals of the housing by means of wire bonding. Again, this requires precise handling of the wire bonds and accurate soldering of the wires to the substrate and the terminals. This requires expensive assembly machinery. In addition, once assembled, it is difficult to repair or replace any of the components if one or more of the sensing elements are found to be defective. The reliability of sensors made using known methods is also suspect, particularly in environments in which the sensor is exposed to extreme vibration. In addition, the solder contains lead which is not environmentally friendly.

It would, therefore, be desirable to provide a sensor assembly, such as a TMAP sensor, which can be assembled without the use of expensive and complicated machinery. It would also be beneficial to provide a sensor assembly which can be easily repaired, is environmentally friendly, and which is reliable over time.

SUMMARY OF THE INVENTION

An exemplary embodiment is directed to a sensor assembly. The sensor assembly has a housing for receiving a substrate. Terminals with substrate mating portions are provided in the housing. The substrate has components mounted thereon and plated openings which extend therethrough. The plated openings are provided in electrical engagement with the terminals. The openings are provided to mechanically and electrically engage the resilient contact portions of the terminals. The substrate mating portions are releasably pressure fit within the plated openings to allow the substrate to be removed and replaced as needed. The substrate mating portions maintain the electrical and mechanical connection between the substrate mating portions and the plated openings when the sensor assembly is exposed to vibration.

An exemplary embodiment is directed a sensor assembly for use in a vehicle. The sensor assembly has a housing with a substrate receiving recess. Terminals with resilient contact portions are provided in the housing. The terminals extend into the substrate receiving recess. A substrate is provided in the substrate receiving recess. The substrate has components mounted thereon and openings which extend therethrough. The openings are provided in electrical engagement with the components. The openings are provided to mechanically and electrically engage the resilient contact portions of the terminals. The resilient contact portions maintain the electrical and mechanical connection between the resilient contact portions and the openings when the sensor assembly is exposed to vibration. The resilient contact portions are releasably pressure fit within the openings to allow the substrate to be removed and replaced as needed.

An exemplary embodiment is directed a sensor assembly for use in a vehicle. The sensor assembly has a housing with a substrate receiving recess. Terminals are provided in the housing. The terminals have multispring resilient contact portions which extend into the substrate receiving recess. A substrate is provided in the substrate receiving recess. The substrate has a temperature sensor and a pressure sensor mounted thereon and openings extending therethrough. The openings are provided in electrical engagement with the pressure sensor and the temperature sensor. Additionally, the openings are provided to mechanically and electrically engage the multispring resilient contact portions of the terminal. The multispring resilient contact portions allow the substrate to be removed and replaced as needed while providing sufficient force to the openings to maintain the electrical and mechanical connection between the multispring resilient contact portions and the openings when the sensor assembly is exposed to vibration.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
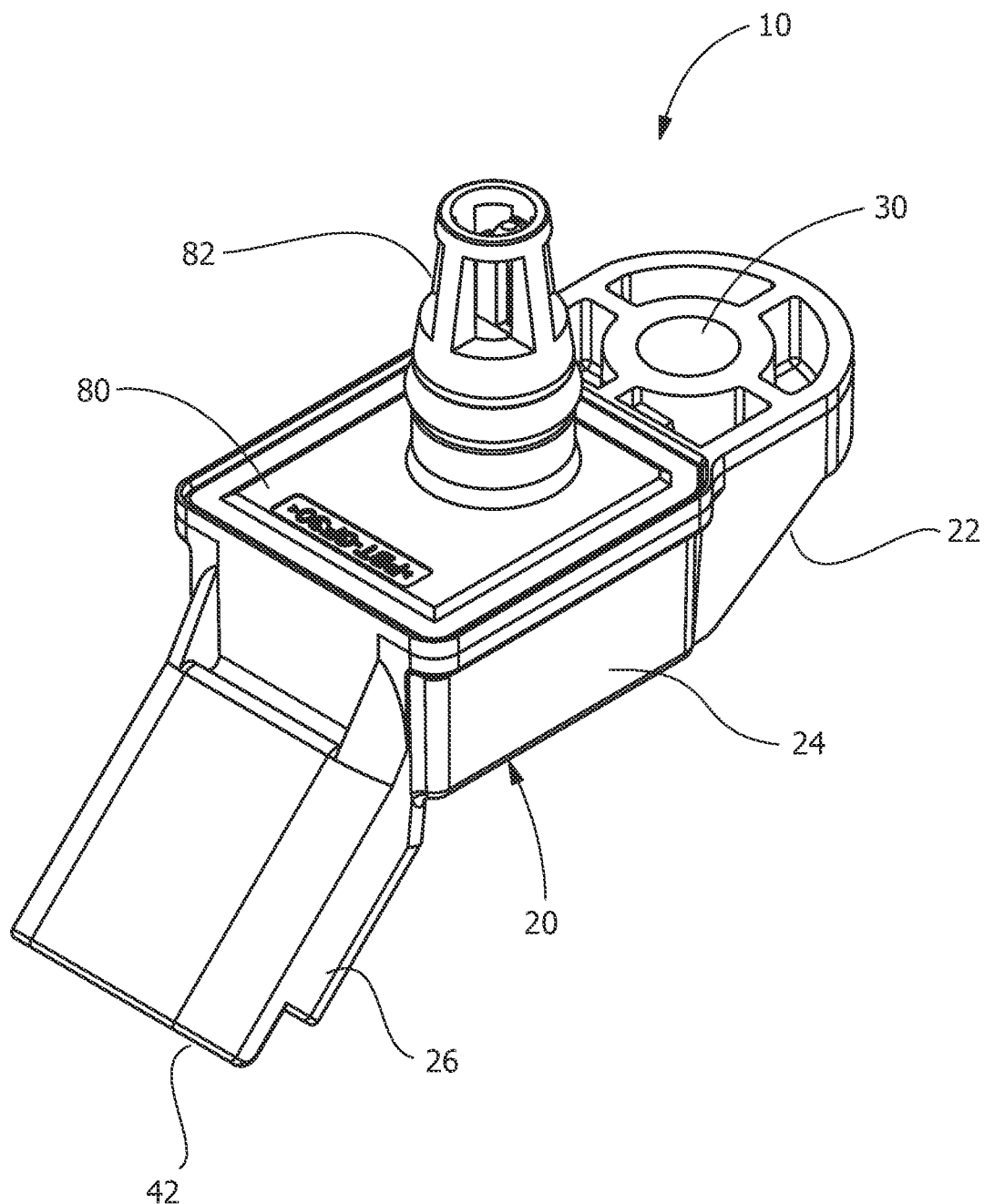
FIG. 1 is a top front perspective view of an exemplary embodiment of a sensor assembly.

Referring to the drawings, wherein like reference numbers refer to like components, the exemplary embodiment of the invention is directed to a sensor assembly which can be assembled without the use of expensive and complicated machinery, and which can be easily repaired, is environmentally friendly, and which is reliable over time in harsh environments, such as engine compartments of a vehicle.

In the exemplary embodiment, the sensor assembly 10 is configured to measure temperature and pressure (TMAP) in an intake manifold of an engine assembly, although other configurations and applications may be used without departing from the scope of the invention. As an example, the sensor assembly 10 may be a manifold air pressure (MAP) sensor, a temperature and manifold air pressure (TMAP) sensor, a manifold temperature sensor, or any other type of sensor sensing a condition within the manifold. In operation, the sensor assembly 10 operates in a known manner by taking various measurements and sending the measurements to an electronic controller or control module (not shown). The control module responds to the information received electronically from the sensor assembly 10, as well as other sensor assemblies and/or sensors, to properly control the engine. Control modules are well known in the industry and will not be described herein if further detail.

Figure 2:
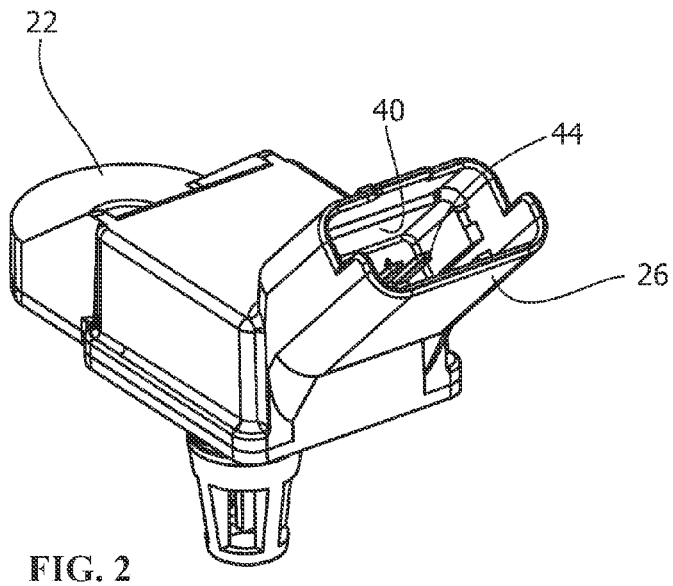
FIG. 2 is a bottom front perspective view of the exemplary embodiment of the sensor assembly of FIG. 1.
Figure 10:
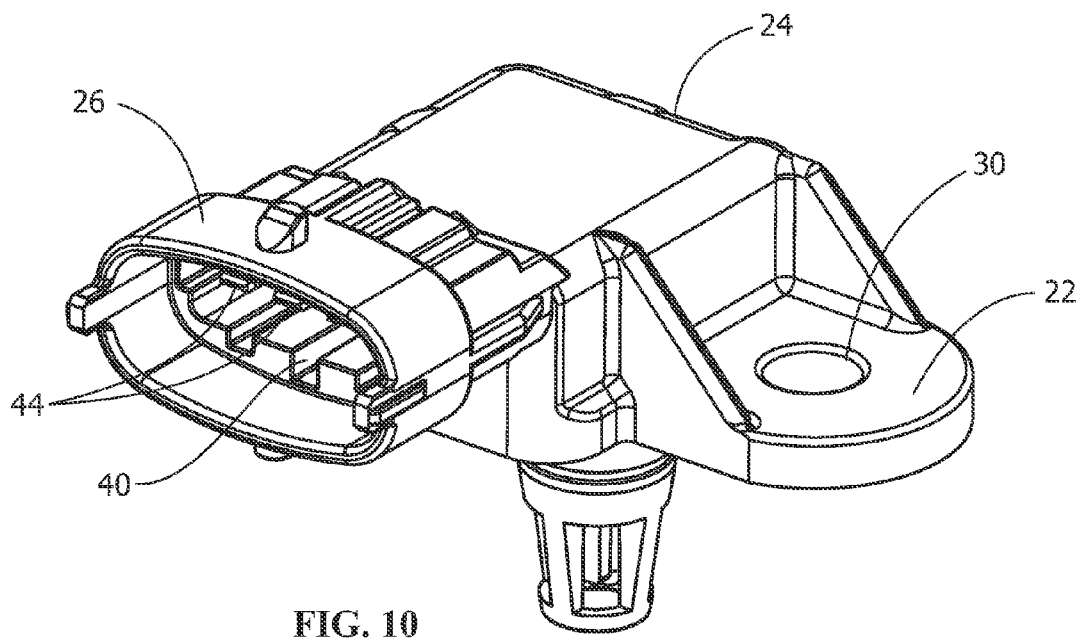
FIG. 10 is a bottom front perspective view of an alternate exemplary embodiment of a sensor assembly.
Figure 11:
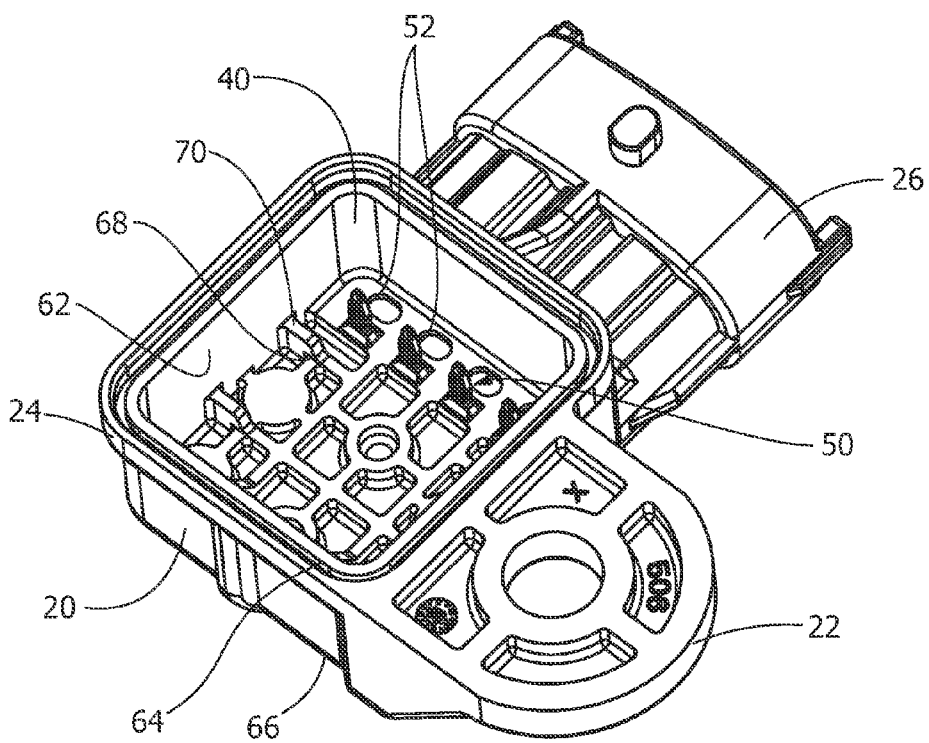
FIG. 11 is a top perspective view of the sensor assembly of FIG. 10 with the substrate removed from the substrate receiving recess.
Figure 12:
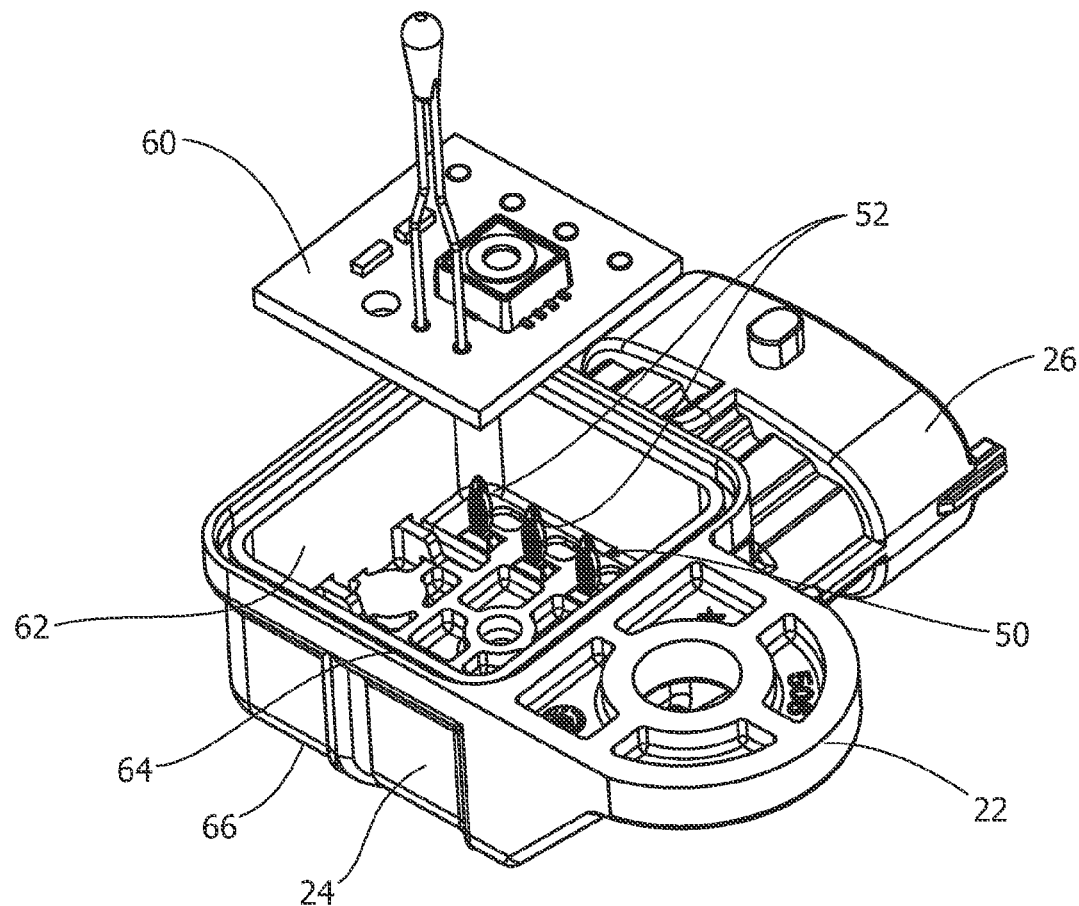
FIG. 12 is a perspective view similar to that of FIG. 11, showing the substrate and contact portions of terminals prior to the mating thereof.
Figure 13:
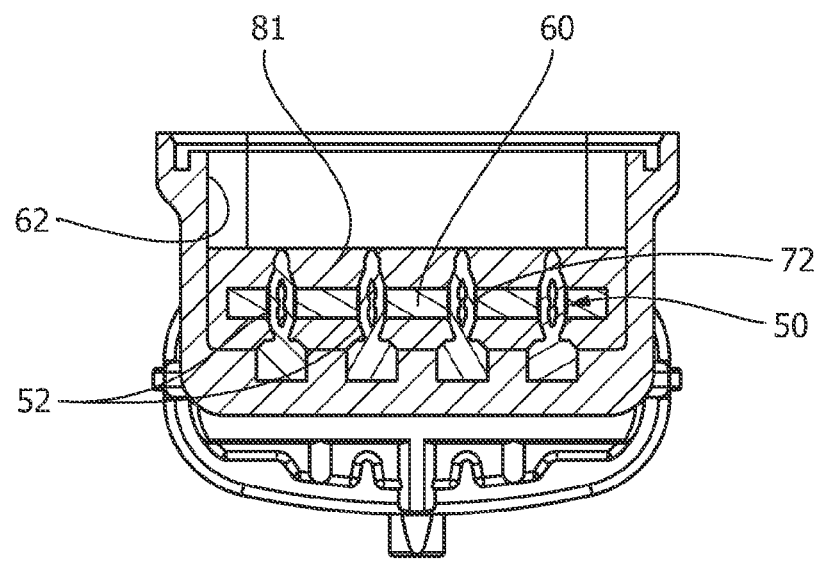
FIG. 13 is a cross-sectional view of the sensor assembly of FIG. 12, with the substrate mated with the contact portions of the terminals.

Referring to FIGS. 1, 2 and 10, the sensor assemblies 10 shown in the exemplary embodiments are TMAP sensors. Each sensor assembly 10 has a housing 20. The housing 20 is made from plastic or any material having the appropriate strength and dielectric characteristics required. In addition, the material used for the housing 20 must be able to withstand the temperature demands of the engine assembly and the engine compartment.

The housing 20 has a mounting portion 22, a substrate receiving portion 24 and a terminal receiving portion 26. The mounting portion 22 is configured to mount the sensor assembly 10 in position relative to the intake. In the exemplary embodiment, the mounting portion 22 has an opening 30 for receipt of mounting hardware (not shown) therethrough. However, other configurations of the mounting portion 22 are within the scope of the invention.

Figure 14:
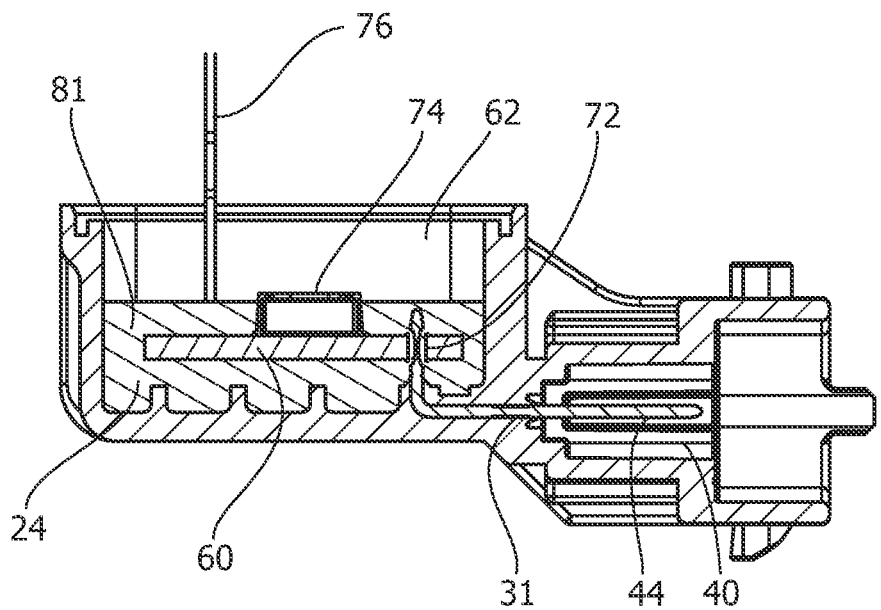
FIG. 14 is an alternate cross-sectional view of the sensor assembly of FIG. 12, with the substrate mated with the contact portions of the terminals.
Figure 15:
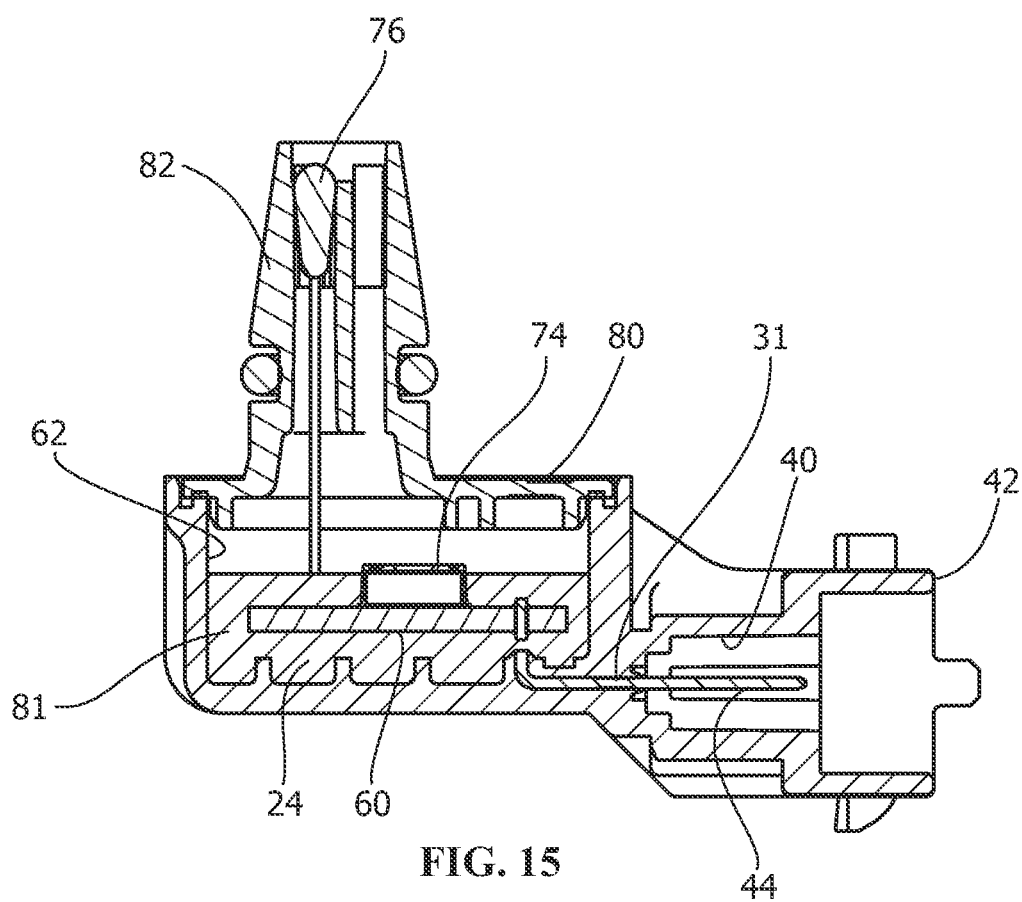
FIG. 15 is a cross-sectional view of the sensor assembly of FIG. 10, showing the substrate mated with the contact portions of the terminals and the cover positioned thereon.

Terminal receiving portion 26 has terminal receiving cavities 40 (as shown in FIGS. 14 and 15) which extend from proximate a mating end 42 of the sensor assembly 10 to the substrate receiving portion 24. Terminal receiving cavities 40 are configured to receive terminals 44 (FIGS. 2, 14 and 15) therein. The terminals 44 are retained in the terminal receiving cavities using known mounting techniques, including, but not limited to, the use of mounting barbs or projections or by overmolding the material of the housing 20 over the terminals 44.

Figure 3:
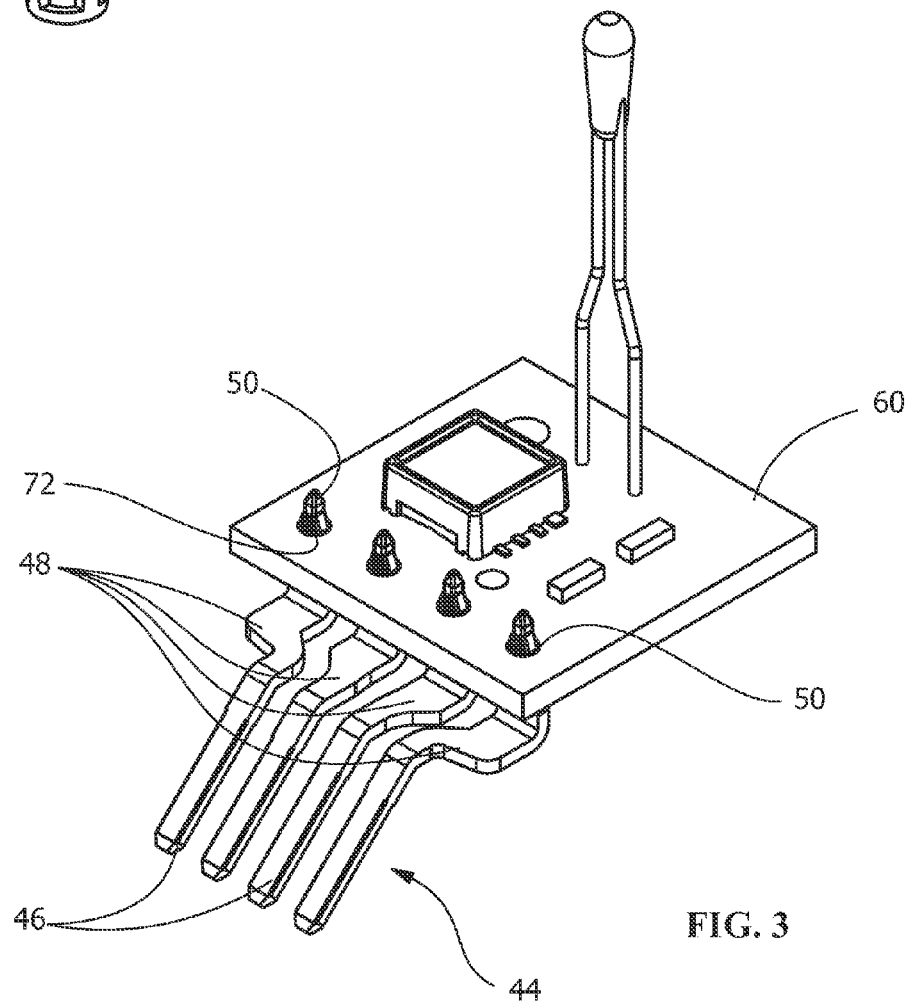
FIG. 3 is a perspective view of the sensor assembly of FIG. 1 with the housing removed to show the electrical components.

Referring to FIG. 3, terminals 44 have connector mating portions 46, transition portions 48 and substrate mating portions 50. The transition portions 48 allow the centerline spacing between the connector mating portions 46 and the substrate mating portions 50 to be varied as required by the mating connector (not shown) and the substrate 60.

Figure 6:
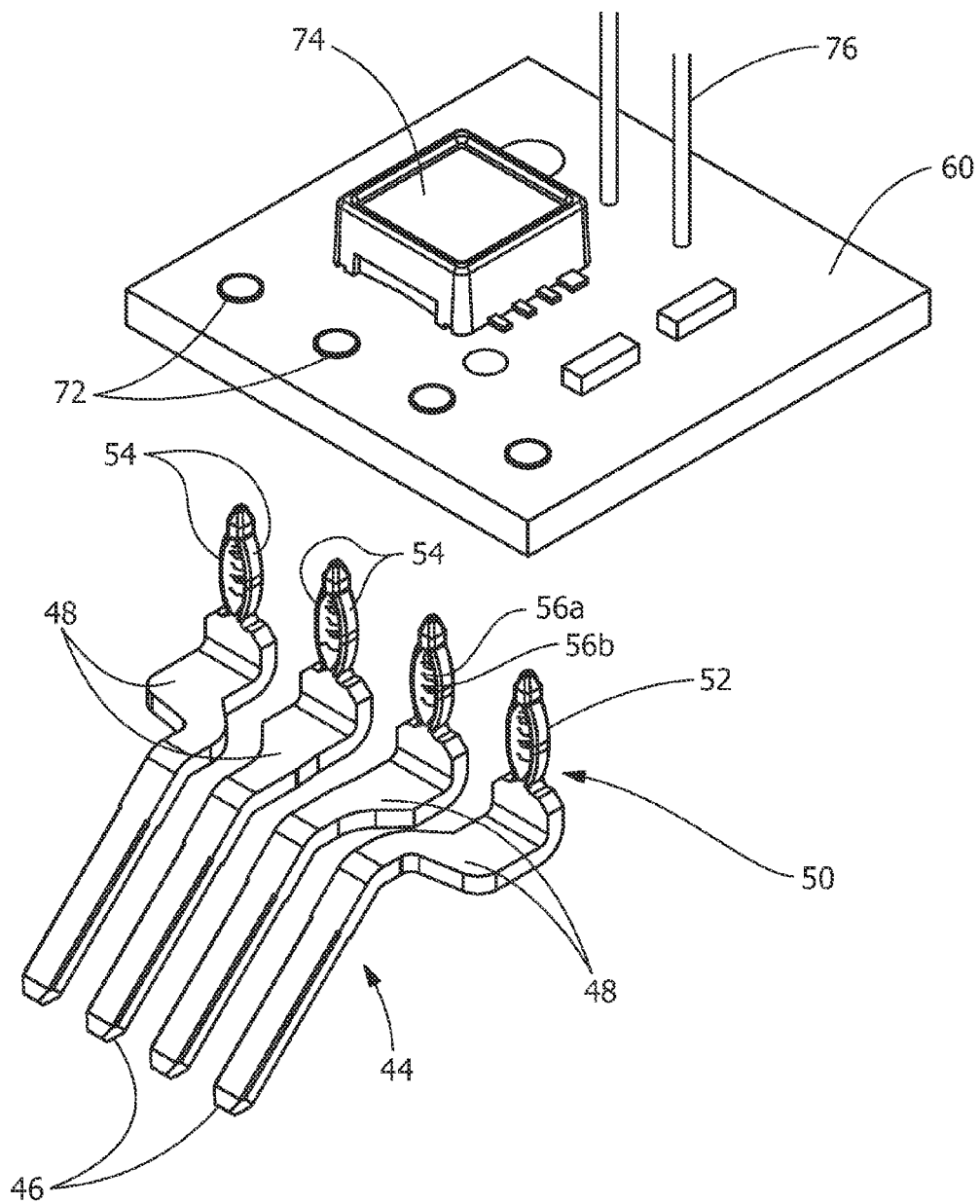
FIG. 6 is a perspective view similar to that of FIG. 3, showing the substrate and contact portions of terminals prior to the mating thereof.
Figure 7:
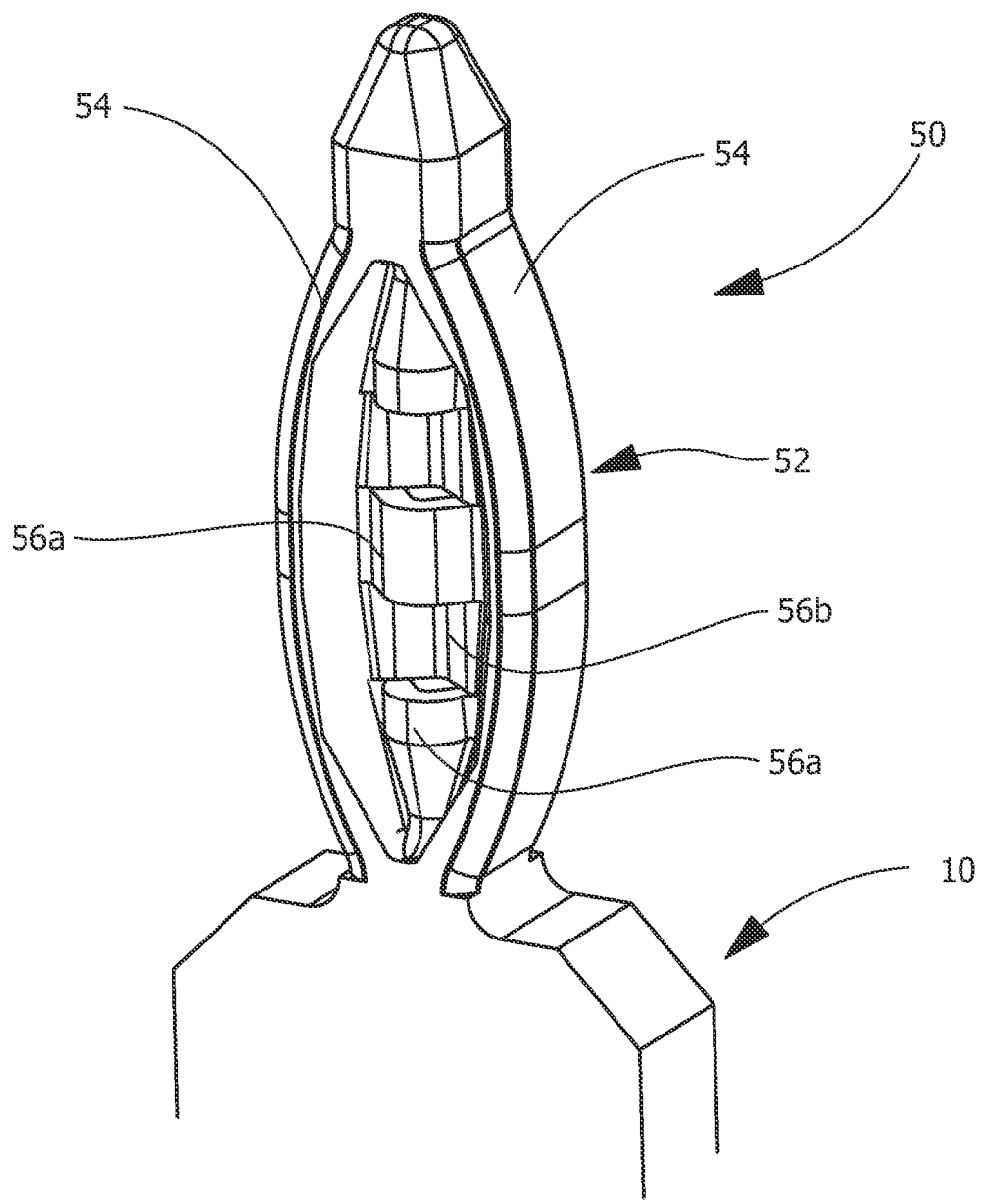
FIG. 7 is an enlarged perspective view of the contact portion of the terminal of the exemplary embodiment.
Figure 8:
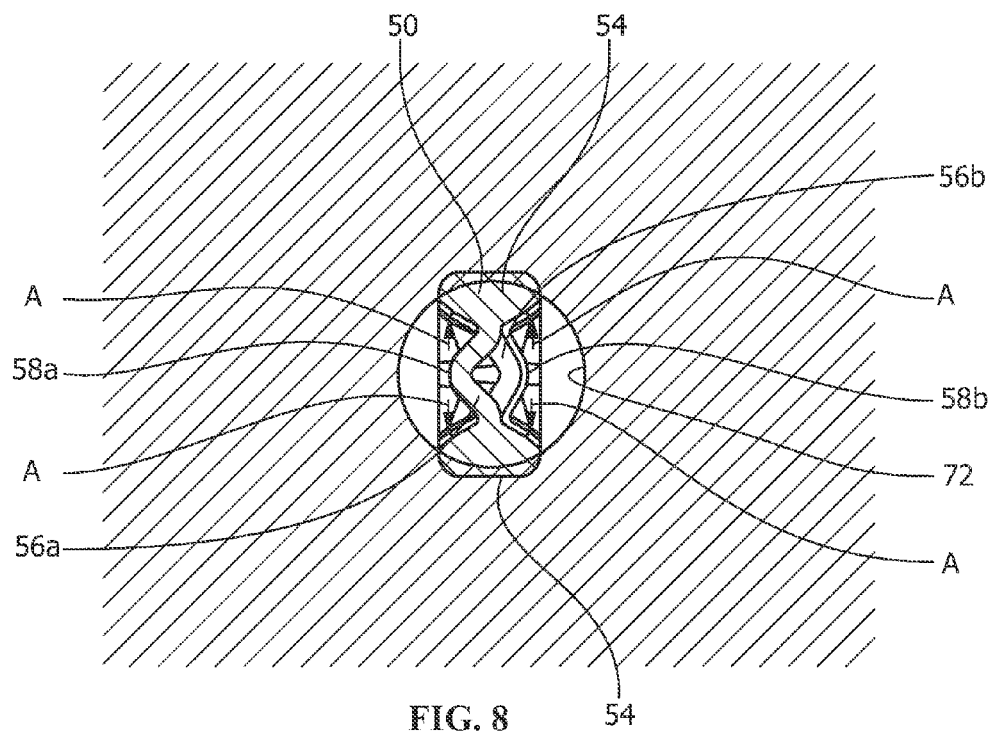
FIG. 8 is a top view of a respective contact portion inserted into a respective opening of the substrate.
Figure 9:
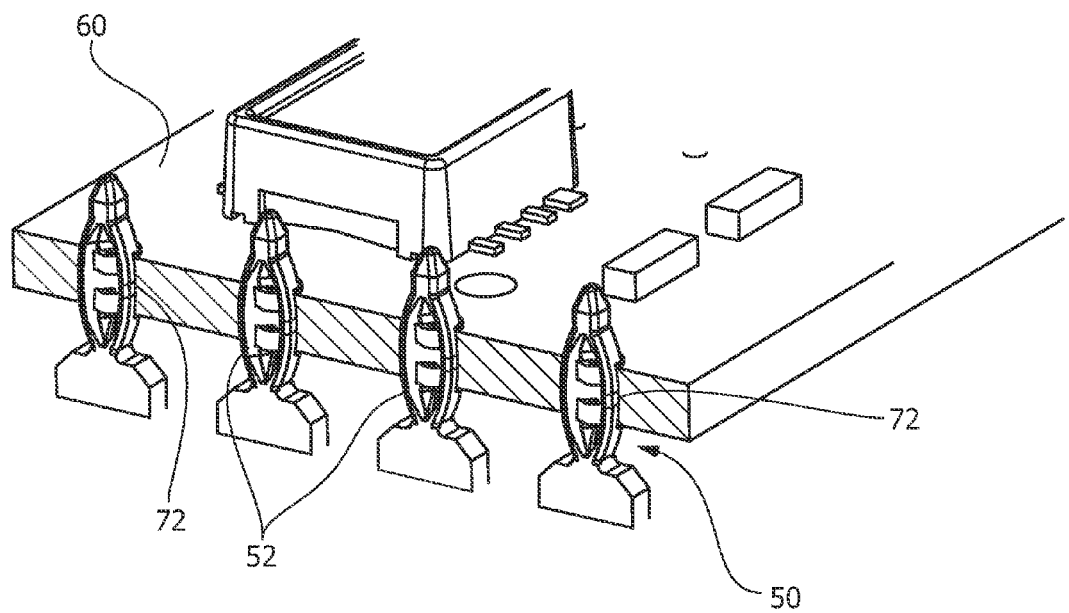
FIG. 9 is a cross-sectional view showing the contact portions inserted into the openings of the substrate.

In the exemplary embodiment as best shown in FIGS. 6, 7 and 8 the substrate mating portions 50 have contact portions 52. In the embodiment shown in FIGS. 7 and 8, the contact portions 52 are multispring compliant pin portions 52 stamped and formed thereon. However, other resilient or compliant contact portions 52 may be used. In addition, the contact portions 52 are not required to be stamped and formed from the terminals 44. As shown in FIG. 7, the contact portions 52 have spaced apart legs 54 which have connecting portions 56a, 56b which extend therebetween. At least one first connecting portion 56a is formed in each contact portion. At least one second connecting portion 56b is formed in each contact portion. As shown in FIG. 8, each first connecting portion 56a has a slight bend 58a therein. Each second connecting portion 56b is offset from the first connecting portion 56a and has a slight bend 58b therein, the bend 58b extending in an opposed direction to the bend 58a of the first connecting portion 56a.

As shown in FIGS. 4, 5, 11 and 12, the substrate receiving portion 24 extends between the mounting portion 22 and the terminal receiving portion 26. The substrate receiving portion 24 has a substrate receiving recess 62 which extends from a first surface 64 of the substrate receiving portion 24 to a second surface 66. The recess 62 is dimensioned to receive a substrate 60 (FIGS. 5 and 12) therein. Positioning projections 68 (FIGS. 5 and 11) are provided in the recess 62, the projections 68 cooperate with the substrate 60 to properly position the substrate 60 in the recess 62. Latching projections 70 (FIGS. 5 and 11) are also provided in the recess. The latching projections 70 cooperate with the substrate to properly secure the substrate 60 in the recess 62.

Referring to FIGS. 3, 5, 8, 9 and 11 through 15, the substrate mating portions 50 of the terminals extend into the recess 62. As shown in FIGS. 3, 8, 9, 13 & 14, plated through holes or openings 72 are provided in the substrate 60 and extend therethrough. The spacing of the openings 72 corresponds to the spacing of the substrate mating portions 50. As shown on FIG. 8, the diameters of the openings 72 are dimensioned to be slightly smaller than the width of the substrate mating portions 50, such that the substrate mating portions 50 will be placed in frictional engagement with the openings 72 upon mating.

In the embodiment shown, the substrate 60 is a printed circuit board, but the substrate is not so limited. As shown in FIGS. 3, 5, 12, 15, the substrate has components, such as, but not limited to, a pressure sensor 74 and a temperature sensor 76 attached thereto. The sensors 74, 76 are electrically connected to the openings 72 by means of leads, traces or conductive pathways (not shown) in a manner known in the art. Other sensors and components may also be mounted to the substrate 60.

As the substrate 60 is mounted in the recess 62, the openings 72 are moved into engagement with the contact portions 52 of the substrate mating portions 50 of the terminals 44. As this occurs, the legs 54 are moved toward each other, compressing the first and second connecting portions 56a, 56b. This causes the first and second connecting portions 56a, 56b to exert a spring force, as represented by arrows A of FIG. 8, as the first and second connecting portions 56a, 56b try to resiliently return to their unstressed position, causing the legs 54 to exert a force on the sidewalls of the openings 72. This forms a type of cold weld between the terminals 44 and the substrate 60, thereby insuring that the mechanical and electrical connection between the substrate mating portions 50 of the terminals 44 and the openings 72 of the substrate 60 is effected and maintained even in harsh conditions in which vibration and the like occur.

Prior to adding potting material, as described below, the substrate 60 and sensors 74, 76 are tested when inserted on the contact portions 52. The use of the resilient contact portions 52 allows the substrate 60 to be replaced if the substrate 60 or the sensors 74, 76 are not performing properly. As the resilient contact portions 52 maintain their resilient characteristics over more than one cycle, the substrate 60 may be removed from the contact portions 52 and a new substrate may be inserted without damaging the contact portions 52 or the sensor assembly 10.

Figure 4:
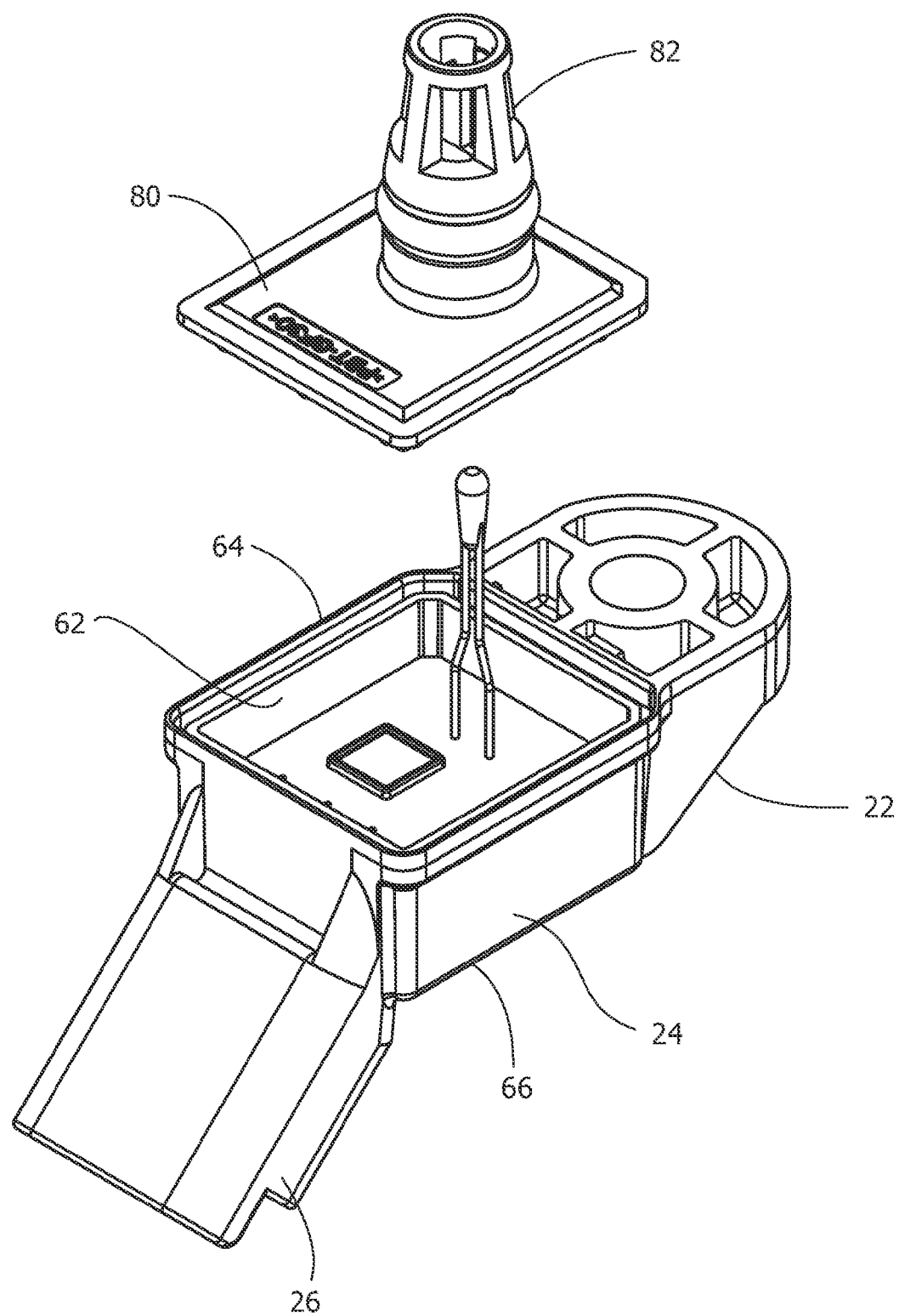
FIG. 4 is a perspective view of the sensor assembly of FIG. 1 with a cover removed.
Figure 5:
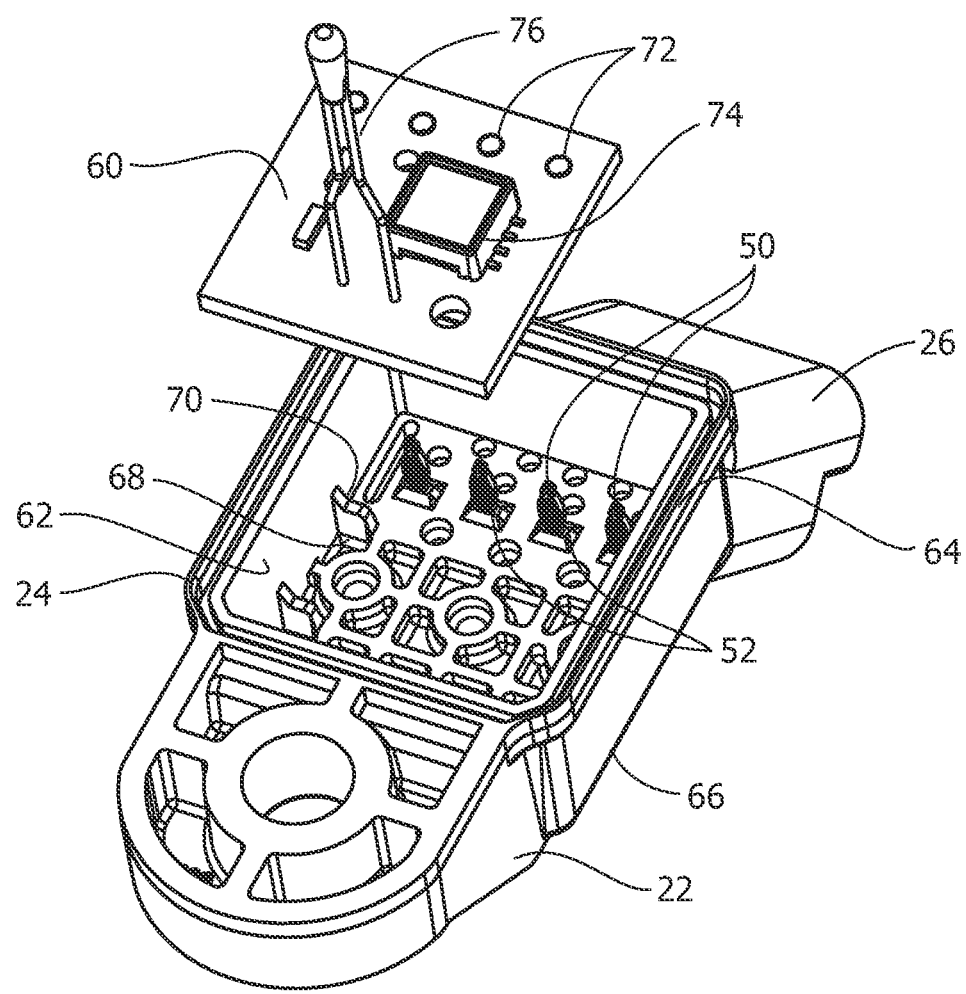
FIG. 5 is a back perspective view of the sensor assembly of FIG. 1 with the substrate removed from the substrate receiving recess.

With the contact portions 52 properly inserted into the openings 72, the substrate 60 engages the positioning projections 68, preventing further movement of the substrate into the recess 60, thereby properly position the substrate 60 in the recess 62. Additionally, with the substrate 60 properly positioned by the projections, portions of the latching projections 70 extend over a top surface of the substrate to prevent the unwanted removal of the substrate to properly latch the substrate 60 in position. As shown in FIGS. 4, 13, 14 and 15, with the substrate 60 properly tested, inserted and maintained in the recess 62, resin or potting material 81 (FIGS. 13, 14 and 15) may be applied to the substrate 60 and recess 62 to isolate the various sensors and components attached to the substrate 60. However, the use of resin or potting material is not required. As shown in FIGS. 1, 4 and 15, a cover 80 is then positioned over the recess 62 and secured to the substrate receiving portion 24. As is shown in FIGS. 1 and 4, the cover 80 may have a tower portion 82 which is configured to receive and protect the temperature sensor 76.

The resilient contact portions 52 of the terminals 44 allow the substrate 60 to be easily assembled without the use of expensive and complicated machinery or assembly equipment required by previous sensor assemblies. In addition, the sensor assembly 10 does not require solder or other types of connections aids, thereby eliminating the use of solder or the like which can contain harmful substances such as lead. The resilient contact portions 52 of the terminals 44 also allow the substrate 60 to be removed and replaced as needed while providing sufficient force to the openings 72 to maintain the electrical and mechanical connection between the resilient contact portions 52 and the openings 72 when the sensor assembly 10 is exposed to vibration or other harsh conditions.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A sensor assembly comprising:
    a housing for receiving a substrate, the housing having a substrate receiving portion and a terminal receiving portion;
    terminals provided in the housing, the terminals having substrate mating portions positioned in the substrate receiving portion and connector mating portions positioned in the terminal receiving portions;
    the substrate having components mounted thereon and plated openings extending therethrough, the openings provided in electrical engagement with the components;
    the substrate mating portions having contact portions which are releasably pressure fit within the plated openings to allow the substrate to be removed and replaced as needed;
    the substrate receiving portion having latching projections which cooperate with the substrate to properly secure the substrate in the substrate receiving recess;
    wherein the substrate mating portions maintain the electrical and mechanical connection between the substrate mating portions and the plated openings when the sensor assembly is exposed to vibration.

2. The sensor assembly as recited in claim 1, wherein the substrate mating portions have resilient contact portions.

3. The sensor assembly as recited in claim 2, wherein the resilient contact portions are compliant portions which are stamped and formed from the terminals.

4. The sensor assembly as recited in claim 3, wherein the resilient contact portions are multispring resilient contact portions.

5. The sensor assembly as recited in claim 1, wherein the components include a pressure sensor.

6. The sensor assembly as recited in claim 1, wherein the components include a temperature sensor.

7. The sensor assembly as recited in claim 1, wherein the substrate receiving portion has a substrate receiving recess is provided in the housing, the substrate receiving recess is configured to receive the substrate therein.

8. The sensor assembly as recited in claim 7, wherein positioning projections are provided in the substrate receiving recess, the positioning projections cooperate with the substrate to properly position the substrate in the substrate receiving recess.

9. The sensor assembly as recited in claim 1, wherein the substrate is a printed circuit board.

10. A sensor assembly for use in a vehicle, the sensor assembly comprising:
    a housing having a substrate receiving recess and a terminal receiving portion;
    terminals provided in the housing, the terminals having resilient contact portions which extend into the substrate receiving recess and connector mating portions positioned in the terminal receiving portions;
    a substrate provided in the substrate receiving recess, the substrate having components mounted thereon and openings extending therethrough, the openings provided in electrical engagement with the components, the openings provided to mechanically and electrically engage the resilient contact portions of the terminals;

the substrate receiving recess having latching projections which cooperate with the substrate to properly secure the substrate in the substrate receiving recess;

wherein the resilient contact portions maintain the electrical and mechanical connection between the resilient contact portions and the openings when the sensor assembly is exposed to vibration;

wherein the resilient contact portions are releasably pressure fit within the openings to allow the substrate to be removed and replaced as needed.

11. The sensor assembly as recited in claim 10, wherein positioning projections are provided in the substrate receiving recess, the positioning projections cooperate with the substrate to properly position the substrate in the substrate receiving recess.

12. The sensor assembly as recited in claim 10, wherein a cover is positioned over the substrate receiving recess.

13. The sensor assembly as recited in claim 10, wherein the resilient contact portions are multispring resilient contact portions.

14. The sensor assembly as recited in claim 13, wherein the resilient contact portions are stamped and formed from the terminals.

15. The sensor assembly as recited in claim 10, wherein the components include a pressure sensor.

16. The sensor assembly as recited in claim 10, wherein the components include a temperature sensor.

17. A sensor assembly for use in a vehicle, the sensor assembly comprising:

a housing having a substrate receiving recess;

terminals provided in the housing, the terminals having multispring resilient contact portions which extend into the substrate receiving recess;

a substrate provided in the substrate receiving recess, the substrate having a temperature sensor and a pressure sensor mounted thereon and openings extending therethrough, the openings provided in electrical engagement with the pressure sensor and the temperature sensor, the openings provided to mechanically and electrically engage the multispring resilient contact portions of the terminal;

the substrate receiving recess having latching projections which cooperate with the substrate to properly secure the substrate in the substrate receiving recess;

wherein the multispring resilient contact portions allow the substrate to be removed and replaced as needed while providing sufficient force to the openings to maintain the electrical and mechanical connection between the multispring resilient contact portions and the openings when the sensor assembly is exposed to vibration.

18. The sensor assembly as recited in claim 17, wherein the multispring resilient contact portions are stamped and formed from the terminals.

* * * * *